(12) United States Patent
Attar et al.

(10) Patent No.: US 11,637,853 B2
(45) Date of Patent: Apr. 25, 2023

(54) OPERATIONAL NETWORK RISK MITIGATION SYSTEM AND METHOD

(71) Applicant: Otorio Ltd., Tel-Aviv (IL)

(72) Inventors: Yair Attar, Tel-Aviv (IL); Leon Levitsky, Petach Tikva (IL); Matan Dobrushin, Givatayim (IL); Aviad Elizur, Sderot (IL); Ido Peled, Tel Mond (IL)

(73) Assignee: OTORIO LTD., Tel-Aviv (IL)

( * ) Notice: Subject to any disclaimer, the term of this patent is extended or adjusted under 35 U.S.C. 154(b) by 294 days.

(21) Appl. No.: 17/203,057

(22) Filed: Mar. 16, 2021

(65) Prior Publication Data

US 2021/0288992 A1 Sep. 16, 2021

(30) Foreign Application Priority Data

Mar. 16, 2020 (IL) .......................................... 273321

(51) Int. Cl.
*H04L 9/40* (2022.01)
*H04L 41/22* (2022.01)
*H04L 41/08* (2022.01)
*H04L 41/0816* (2022.01)

(52) U.S. Cl.
CPC ...... *H04L 63/1433* (2013.01); *H04L 41/0816* (2013.01); *H04L 41/0879* (2013.01); *H04L 41/0886* (2013.01); *H04L 41/22* (2013.01); *H04L 63/1416* (2013.01); *H04L 63/1425* (2013.01)

(58) Field of Classification Search
CPC ............. H04L 63/1433; H04L 41/0816; H04L 41/0879; H04L 41/22; H04L 63/1416; H04L 63/1425

USPC ........................................................... 726/25
See application file for complete search history.

(56) References Cited

U.S. PATENT DOCUMENTS

| | | | |
|---|---|---|---|
| 7,971,252 B2 * | 6/2011 | Lippmann | H04L 63/1433 707/999.1 |
| 9,100,430 B1 | 8/2015 | Seiver et al. | |
| 9,912,683 B2 * | 3/2018 | Cam | H04L 63/1433 |
| 9,954,883 B2 * | 4/2018 | Ahuja | H04L 63/1433 |
| 9,973,524 B2 * | 5/2018 | Boyer | G06Q 10/0639 |
| 9,992,219 B1 | 6/2018 | Hamlet et al. | |
| 10,382,473 B1 | 8/2019 | Ashkenazy et al. | |

(Continued)

FOREIGN PATENT DOCUMENTS

EP 3021546 A1 5/2016

OTHER PUBLICATIONS

Carson, Joseph, 8 Steps to Stronger Passwords Enterprise-Wide, Mar. 21, 2017, pp. 1-2.

(Continued)

*Primary Examiner* — Badri Narayanan Champakesan
(74) *Attorney, Agent, or Firm* — Browdy and Neimark, P.L.L.C.

(57) ABSTRACT

A computer network risk mitigation system includes a computerized platform configured to utilize gathered contextual data regarding cyber-risk metrics in are operational technology network. The computerized platform is configured to conduct network configuration changes in accordance with the gathered contextual data in order to mitigate cyber-security threats. Methods for refining a network attack graph and for utilizing risk score evaluation are also described.

6 Claims, 4 Drawing Sheets

(56) References Cited

U.S. PATENT DOCUMENTS

| | | | |
|---|---|---|---|
| 10,601,845 B2* | 3/2020 | Ben Ezra | H04L 63/1433 |
| 10,778,713 B2* | 9/2020 | Zeng | G06N 3/08 |
| 11,277,431 B2* | 3/2022 | Trivellato | H04L 63/1433 |
| 2013/0318615 A1* | 11/2013 | Christodorescu | G06F 21/00 726/25 |
| 2013/0318616 A1* | 11/2013 | Christodorescu | G06F 21/552 726/25 |
| 2014/0380488 A1* | 12/2014 | Datta Ray | H04L 63/1408 726/25 |
| 2015/0058993 A1* | 2/2015 | Choi | H04L 63/1433 726/25 |
| 2016/0050225 A1* | 2/2016 | Carpenter | G06F 21/577 726/25 |
| 2016/0330228 A1* | 11/2016 | Knapp | G06F 21/57 |
| 2017/0286690 A1* | 10/2017 | Chari | G06F 21/577 |
| 2017/0289187 A1 | 10/2017 | Noel et al. | |
| 2019/0041830 A1 | 2/2019 | Yarvis et al. | |
| 2019/0260785 A1 | 8/2019 | Jenkinson et al. | |
| 2020/0244691 A1 | 7/2020 | Veeramany et al. | |
| 2020/0311630 A1* | 10/2020 | Risoldi | G06F 3/0482 |
| 2021/0021629 A1* | 1/2021 | Dani | H04L 63/1433 |
| 2021/0288995 A1* | 9/2021 | Attar | H04L 41/0879 |

OTHER PUBLICATIONS

FORTINET, Vulnerability Assessment Report, 2018, pp. 1-12.
Shandilya, et al., Use of Attack Graphs in Security Systems, Journal of Computer Networks and Communications, 2014, pp. 1-14.

\* cited by examiner

OPERATIONAL NETWORK RISK MITIGATION SYSTEM AND METHOD

FIELD OF THE INVENTION

The present indention relates to cyber-security systems and methods and, more particularly but not exclusively, to industrially-dedicated automated orchestration and response systems and methods.

BACKGROUND OF THE INVENTION

As the adoption rate of digital tools in industrial environments (also known as "Industry 4.0") continues to increase, cybersecurity risks have become a major concern for industrial companies looking to improve efficiency and competitiveness. Industrial environments are considered part of the operational technology (OT) sub-sector that comprises, among many other fields. OT networks and carrying out and controlling various aspects of operational processes (for example, as in a manufacturing plant, traffic management systems, hospital operation systems, or other continuous time sensitive operating systems). The need to provide a secure and stable environment for operational processes makes this sub-sector much less tolerant to interruptions when compared to the entire information technology (IT) sector. In the OT sub-sector, effective preventative risk reduction is a necessity since the impact of compromised industrial control systems (ICS) may lead to devastating repercussions on businesses, operations, and even on the safety level of people and equipment involved.

As part of recent developments, digitization boosts the convergence of IT and OT and industries are expected to see more IT related threats leaking into all level OT environments. Therefore, industry of all levels is witnessing a dramatic increase in cyber threats. For example, between the years 2013 and 2018, the number of vulnerabilities in ICS components has increased by almost 40%. As a result, it is becoming increasingly challenging for network and security personnel to resolve or even acknowledge acute security gaps, especially when using existing manual tools. Manual tools have additional drawbacks such as requiring a high level of expertise, limitations of scope, and representation of only a single point in time.

One example to an automated risk mitigation solution approach that may be used in OT is SOAR (Security Orchestration, Automation and Response). It is a solution stack of compatible software programs that allow an organization to collect data regarding security threats originating from multiple sources and provide a response to security threats without human assistance.

By using an industrial-dedicated automation tools, one can significantly reduce the time and efforts that go into identifying, sorting, prioritizing, and resolving emerging security threats. In order to achieve effective and efficient automation, there is a need to collect and prioritize relevant data which in turn may help security teams to focus their resources fixing the most critical vulnerabilities first.

Such fixing may involve any software/application/component with detected vulnerabilities and may require various remediations. After establishing which vulnerabilities require the most immediate attention, and mapping out a timeline and a workplan for the fix, the fixing may begin. Vulnerability remediation in proprietary code requires considering the root cause of a security vulnerability that needs to be fixed.

Remediation to a certain code might include: software patching, disabling the vulnerable process, removing a vulnerable component, updating system configuration/conducting configuration changes or updating the platform or service that are used by the network/team.

Said procedures, if successful, may serve to provide a good permanent solution to a detected security vulnerability. After a fix or patch are deployed, it's important to continue monitoring it to ensure its security and verify that the fix does not affect other processes or configurations within the system. In addition, newly discovered security vulnerabilities might raise a need to add more security layers to a system's parameters. As mentioned above, the disclosed procedures may be performed manually or by machine.

Achieving correct prioritization with good performance (timely and accurate) is highly important and has a practical effect on the feasibility of implementation by the operational personnel. However, determining optimal prioritization could be challenging due to the increased complexity and scale of the IT and OT networks, lack of cybersecurity skills within operation teams, and the need to incorporate threat intelligence information regarding various vulnerabilities as well as possible business impacts along with operational requirements.

Thus, there is a need to provide a system and method that can utilize contextual information regarding cyber threats to operational networks and assets and provide an organization-specific continuous view of cyber risk metrics along with deep insights regarding the cybersecurity stature. Such metrics can be used to potentially activate automated/manual configuration or reconfiguration processes, such as network, OT, ICS or other manufacturing floor changes used for risk mitigation. Said system and method may use a simulated attack analysis and data which can be automatically collected from network devices and OT vulnerability reports. The results of such analysis simplify various industrial security operations, including periodical risk assessments and compliance audits, penetration testing, forensic investigations and real time alterations of OT, ICS or to other manufacturing floor components.

Moreover, there is a need to improve both the level in which business-specific attributes are incorporated within the evaluation of the security metrics, as well as the computational efficiency of said security metrics.

The proposed invention presents a systematic approach for evaluating network security state, prioritizing risk mitigation steps and utilizing protective measures upon OT networks.

SUMMARY OF THE INVENTION

The present invention provides a computer network risk mitigation system and method, that can evaluate network security state, prioritize risk mitigation steps and utilize protective measures upon OT networks.

Said system and method may utilize contextual information regarding cyber threats to operational networks and assets and provide various organization-specific continuous views of cyber risk metrics.

Said system and method may further use a simulated attack analysis and data which can be collected from network devices and OT vulnerability reports.

Said system and method may use the aforementioned procedures and gathered data to potentially activate automated/manual configuration or reconfiguration processes while requiring relatively low computational resources.

The following embodiments d aspects thereof are described and illustrated in conjunction with systems, devices and methods which are meant to be exemplary and illustrative, not limiting in scope. In various embodiments, one or more of the above-described problems have been reduced or eliminated, while other embodiments are directed to other advantages or improvements.

According to one aspect, there is provided a computer network risk mitigation system, comprising a computerized platform configured to utilize gathered contextual data regarding cyber-risk metrics in an operational technology network.

According to some embodiments, said computerized platform is configured to conduct network configuration changes in accordance with the gathered contextual data in order to mitigate cyber-security threats.

According to some embodiments, the gathered contextual data is used to facilitate an automated network segmentation.

According to some embodiments, the automated network segmentation is enabled in accordance with vulnerabilities of assets in the network.

According to some embodiments, the gathered contextual data is used to patch the vulnerable assets in the network in real time.

According to some embodiments, the gathered contextual data is translated into a detailed report.

According to some embodiments, the gathered contextual data is in the form of a network attack graph.

According to some embodiments, the gathered contextual data is in the form of any kind of vulnerability analysis.

According to some embodiments, the cyber security threats mitigation is conducted using prioritizing risk mitigation steps.

According to some embodiments, the prioritization of risk mitigation steps is conducted by utilizing risk scoring methods.

According to a second aspect, there is provided a method for refining a network attack graph comprising the steps of constructing a network attack graph that relates to potential exploitation of network vulnerabilities, determining a score for each one of said detected vulnerabilities and determining a score related to the importance level of every device in the network wherein the aforementioned scores determination provides for a database used for the removal of cycles from the network attack graph.

According to some embodiments, a detection of cyclic edges of the cycles to be removed from the network attack graph is conducted using a FindCyclicEdges (as such term is discussed below) type algorithm.

According to a third aspect, there is provided a method for utilizing risk score evaluation comprising the steps of removing cycles from a network attack graph and computing security metrics in accordance with the produced network attack graph.

According to some embodiments, a risk score evaluation is used to determine the priority of security aps detected in the network attack graph.

According to some embodiments, the risk score evaluation accounts for the severity of detected vulnerabilities in the network, the importance level of every device on the network and the potential distribution of detected exploits.

According to some embodiments, the risk score evaluation is followed by protective measures to be conducted upon the network.

According to some embodiments, the protective measures comprise patching the network.

According to some embodiments, the protective measures comprise manual reconfiguration of the network.

According to some embodiments, the protective measures comprise machine instigated reconfiguration of the network.

According to some embodiments, the protective measures comprise segmentation of the network.

According to some embodiments, evaluating the risk score is conducted using ComputeRiskScores (as such term is discussed below) algorithm.

According to some embodiments, the protective measures comprise blocking of malicious application signatures.

According to some embodiments, the protective measures comprise applying blocking rules for unwanted communication in the network.

According to some embodiments, the protective measures comprise modifying log-in credentials to an asset within the network.

According to a fourth aspect, there is provided a method for utilizing a risk score evaluation comprising the steps of computing node sums for each network node by summing the importance scores of vulnerable devices which belong to a respective node, computing edge sums for each network edge by summing the vulnerability scores of the vulnerabilities on a respective edge, computing inward edge sum for each node by summing the edge sums of edges directed to a respective node, computing edge weights by normalizing the edge sum with an inward edge sum of a target node, computing a node weights vector, wherein a weighted adjacency matrix is set in accordance with the values obtained by computing edge weights, and wherein an intrinsic value vector is set in accordance with the values obtained by computing node sums, computing device impact scores and computing the security risk scores for each separate vulnerability.

According to some embodiments, the calculated risk score evaluation is utilized as part of a network risk mitigation and followed by protective measures to be conducted upon the network.

According to some embodiments, a detailed report is created based on said risk score evaluation.

According to some embodiments, a user resolves the detected security gaps by manually applying configuration changes to mitigate relevant network vulnerabilities.

According to some embodiments, an automated network segmentation is facilitated to mitigate relevant network vulnerabilities.

According to some embodiments, short execution times are enabled during the conduction of the automated network segmentation by restricting the number of devices in the network.

According to some embodiments, the protective measures comprise blocking of malicious application signatures.

According to some embodiments, the protective measures comprise applying blocking rules for unwanted communication in the network.

According to some embodiments, the protective measures comprise modifying login credentials to an asset within the network.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention.

In the Figures.

DETAILED DESCRIPTION OF SOME EMBODIMENTS

Figure 1:
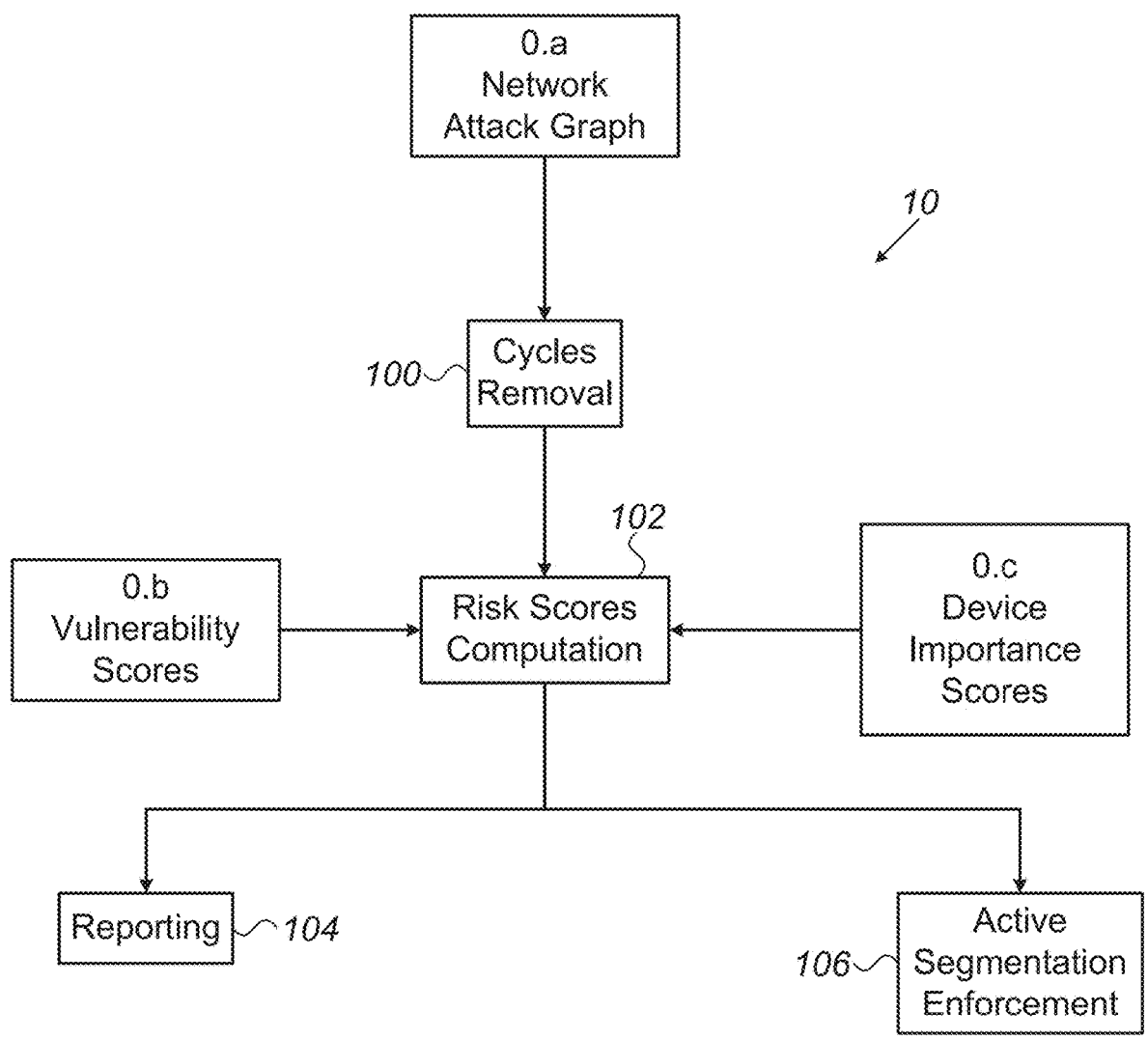
FIG. 1 constitutes a flowchart diagram illustrating the operation of a risk mitigation system and method, according to some embodiments of the invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Unless explicitly stated, the method embodiments described herein are not constrained to a particular order or sequence. Additionally, some of the described method embodiments or elements thereof can occur or be performed simultaneously, at the same point in time, or concurrently.

The term "vulnerability analysis" as used herein, refers to the process of analyzing, identifying, quantify, and prioritizing (or ranking) the vulnerabilities in a network. It is used by network administrators to evaluate the security architecture/strength of the network and devising a protection of it from possible threats. Vulnerability analysis is considered as a useful tool for analyzing security level of a network. Traditional vulnerability analysis provides a means to account for the network's topology and segmentation in which each vulnerability is considered separately from its context.

The term "network attack graph" as used herein, refers to a model or analysis configured to provide data regarding a network's topology, segmentation, vulnerability, etc. A network attack graph may represent all the possible ways in which an attacker spreads across different segments of a certain network by using, for example, various exploitations of vulnerabilities, which may exist on said work. A network attach graph may describe, for example, multiple attack paths, each representing a sequence of steps necessary to implement an attack. The attack paths may be executed, for example, by aggregation of individual exploits of existing vulnerabilities. Attack graph analysis provides complementary capabilities to the traditional vulnerability analysis, which relies solely on vulnerability scanning.

The term "attack surface" as used herein, refers to all of the different points (or subnets) that an attacker can use to get into a system (given its starting point), and where said attacker could get data out. The purpose of an attack surface analysis is to understand the risk areas in a network, to make developers and security specialists aware of what parts of the network are vulnerable to an attack and to find ways of minimizing this risk.

The term "cycles" as used herein refers to a non-empty trail in which the only repeated vertices are the first and last vertices. A directed cycle in a directed graph is a non-empty directed trail in which the first and last vertices are the only ones being repeated.

The term "cyclic edges" as used herein, refers to a quality/feature of a certain cycle. Said cycle is characterized in that it represents a scenario wherein an attacker attacks odes/subnets he already visited before, taking into account the attacker starting point. In other words, "cyclic edge" is a representation that ma appear in an attack graph, wherein said representation symbolizes a see where an attacker returns to a node which he has already visited (exploited) in a previous state. Cyclic edges require some edge between a source node and a target node, meaning, where getting to the source node requires passing through the target node in the first place.

The term "risk mitigation" as used herein, refers to strategies used to prepare for and lessen the effects of threats directed toward a network. Comparable to risk reduction, risk mitigation takes steps to reduce the negative effects of threats and disasters on a network such as by way of segregation of certain parts of the network or the "patching" of certain inflicted applications or components of the network such as the patching of a firmware update in an asset, patching of a programmable logic controller (PLC), performing operating system patching in a Windows™ engineering station, updating an application to a less vulnerable version with comparison to the original version, etc. Risk mitigation may further include configuration changes such as changing firewall rules to block communication to/from specific internet protocol (IP) addresses and may be done through a particular port or by using a specific communication protocol. Other threats that might put a network at risk and require risk mitigation approach includes cyberattacks, weather events or any other form of physical or virtual damage to a network.

The term "artificial intelligence" or AI, as used herein, refers to a field in computer science dealing with intelligence demonstrated by machines, in contrast to the natural intelligence displayed by humans. Colloquially, the term "artificial intelligence" is often used to describe computers that can mimic "cognitive" functions that humans associate with the human mind, such as learning and problem solving.

The term "deep neural network" or DNN, as used herein, refers to a computer model that include connectionist systems that are inspired by, but not identical to, biological neural networks that constitute animal brains. A deep neural network can consist of multiple layers. The data elements which are the output of a given layer are typically the input of the following layer (though sometimes the output of given layer can also be used as an input of a deeper layer which is not the following one). A "deep" neural network is a neural network which has at least one "hidden" layer. A hidden layer is a layer that has two properties: its input is not the input of the system (but the output of other layer(s)); its output is not the output of the system (but is used as an input to other layer(s)). The properties of a hidden layer typically mean the designer of the system does not know what the hidden layer represents in the calculation and "blindly trusts" the training process to "imbue something useful" into the layer.

According to some embodiments, a systemic approach to the evaluation of a network security state and to the prioritization of risk mitigation steps may be accomplished by utilizing a novel risk scoring metric, which takes into consideration the characteristics of detected vulnerabilities, contextual information in terms of asset business impacts, and the attack surface, which is exposed when each asset is compromised. Such approach may substantially contribute to the continued operative status of the ICS, OT or any manufacturing floor.

According to some embodiments, the attack surface is evaluated from a network's attack graph and the security metrics are evaluated for every security gap detected during a vulnerability scan. Moreover, sorting the potentially exploitable vulnerabilities according to their evaluated risk scores provides the means to easily, determine which devices should be patched.

According to some embodiments, an operator of the risk mitigation system or method that may be, for example, a manufacturing security officer, IT officer at the operating plant, automation engineer, cyber analyst, organization's security officer, maintenance operator etc., may determine protective and mitigating actions in accordance with security metrics provided preemptively or in real-time. According to some embodiments, said security metrics may facilitate an automated enforcement of preemptive or real-time network segmentation. Such preemption or real-time segmentation may be obtained by training the risk mitigation system on the basis of prior information and occurrences. According to some embodiments, training the risk mitigation tem may rely on multiple factors such as network topology, operational processes and manufacturing units, sensitive assets, IT, OT or port related vulnerabilities, needed communication between processes and assets, needed access permissions, etc.

According to some embodiments, training of the risk mitigation system and method may be conducted using any sort of AI model. For example, a DNN model may be used in order to achieve a self-learning platform capable of autonomous decision making on a basis of past attacks analysis. Such AI model may further provide an autonomous and adaptive platform capable of preventing attacks of various kinds as well as correcting vulnerabilities before an actual attack occurs.

Reference is now made to FIG. 1 which schematically illustrates a flowchart diagram of the operation of a risk mitigation system and method of the present invention. As shown, risk mitigation system 10 uses an attack graph analysis with a computationally efficient derivation of a novel security risk scoring metric.

According to some embodiments, such a risk scoring metric is computed for every potential exploit in a network which was detected by the attack graph simulation. According to some embodiments, said computation may result in a detailed report/documentation directed to be manually inspected by a user. According to some embodiments, risk mitigation system 10 can be applied to machine instigated modification of the filtering rules of firewall devices (or any network security system that monitors and controls incoming and outgoing network traffic across a network), and thus efficiently mitigate a security risk. According to some embodiments, operations indications 0.a, 0.b, and 0.c signify the preliminary data, which should be made available to the cyber-security algorithm controlling the risk mitigation system and method 10 before execution of dedicated means.

According to some embodiments, in operation 0.a, an attack graph which represents all the possible ways in which an attacker operates within a certain network is constructed, wherein said attack graph may comprise multiple attack paths. For computational efficiency reasons, individual network devices may be grouped into network segments as part of the attack graph generation in order to reduce runtime of the risk metric evaluation and save on computing resources.

According to some embodiments, in operation 0.b, a vulnerability score is calculated to show the availability of non-negative indicators of a security risk, or the severity for each one of vulnerabilities presented in the attack graph. According to some embodiments, Common Vulnerability Scoring System (CVSS) may often be used for this purpose.

According to some embodiments, in operation 0.c, device importance scores are calculated to show the availability of film-negative indicators of assets' importance or business impact, for every device on the network.

According to some embodiments, and after the above operations have been conducted, operation 100 may include the removal of cycles from the attack graph. The reason for cycles removal is the fact that a cycle does not add any valuable information to the risk analysis, and moreover, it may bias the computation of security metrics. Therefore, and according to some embodiments, all or some cycles need to be removed from the attack graph.

According to some embodiments, cyclic edges are detected using a method commonly named as "FindCyclicEdges (V, E, START)" as disclosed below:

Input:

The combined set (V, E) denotes the directed attack graph, where:

$V \in \{v_1, v_2, \ldots, v_N\}$ is the set of nodes, representing network segments $E \in \{(v_{source}^{(1)}, v_{target}^{(1)}), \ldots, (v_{source}^{(M)}, v_{target}^{(M)})\}$ is the set of edges in the graph where $\forall i: v_{source}^{(i)}, v_{target}^{(i)} \in V, v_{source}^{(i)} \neq v_{target}^{(i)}$ START denotes the attacker's initial location on the graph (as per FIG. 2).

Output:

CyclicEdges—a list of edges that create cycles

According to some embodiments, the "FindCyclicEdges" method may be substantially disclosed by the following actions:

1. Compute Dist[w], the minimal distance of node w from START, for all nodes in w∈V using a breadth-first search (BFS) algorithm, 2. FindCyclicEdges←φ (empty set)

3. For every edge (u,v) E:

3.1. If v is START:

3.1.1. Append (u,v) to FindCyclicEdges algorithm 3.2. Else if Dist[u]>Dist[v]:

3.2.1. Perform a backward traversal DES (as such term is discussed below), starting from u, and skipping node v, to find if there's an alternative path to START. Such a path necessarily exists if the traversal reaches a node w where and Dist[w] Dist[v], w≠v.

3.2.2. If no alternative path to START was found, append (u,v) to FindCyclicEdges algorithm.

4. Return to Find CyclicEdges algorithm.

According to some embodiments, a cyclic edge may be defined in such a way, that given a starting point s and wherein cycle c=$v_1, \ldots, v_n, v_1$ and where d(s, $v_1$)<d(s, $v_n$) (distance from s to $v_1$ is smaller than distance from s to $v_n$), then a cycle edge ($v_n, v_1$, is considered as cyclic edge if $v_n$ is reachable only $v_1$. (wherein G'=(V\{v1}, E\{($v_n, v_1$)}), d(s, $v_n$) must be ∞ (since there is no path from s to $v_n$).

According to some embodiments, after the removal of cyclic edges (by way of a computation of the sort described above), security metrics are computed over the resulting attack graph. In operation 102, a security risk scores computation procedure is conducted in order to evaluate and prioritize the security gaps which may have been detected in the network.

According to some embodiments, the computation of the security risk scores 102 accounts for 3 following factors:

a. The severity of the vulnerabilities that may have been detected in the network. The security risk scores 102 will be higher for exploits with higher severities.

b. The importance level of each device on the network. The security risk scores 102 be higher in cases where the target of the potential exploits is of higher importance.

c. The potential distribution of attacks (e.g. the topology of the graph), for example, exploits into devices and network segments with a low number of incoming exploits and a high number of outgoing exploits will have higher importance and vice versa, and will affect the security risk scores 102 accordingly.

According to some embodiments, the security risk score 102 may be substantially disclosed by the following method "ComputeRiskScores" (V', E', EXPLOITS, DEVICES, IMPORTANCE) as follows:

Input:
The combined set (V', E') denotes the reduced directed graph, obtained from the original
attack graph (V, E) by the removal of cyclic edges.
EXPLOITS holds the information about all the possible exploits between any two segments in the network: The use of the notation Exploits (u, v)={$e_1, e_2, \ldots, e_{L_{(u,v)}}$} represents exploits which correspond to the edge on the graph between two nodes u, v∈V'.
Every individual exploit e has the following attributes:
SourceNode(e) source node (segment)
SourceDevice e source device
TargetNode(e)—target node (segment)
TargetDevice(e)—target device
VulnerabilityScore(e)—vulnerability score
DEVICES holds information about all the vulnerable devices that belong to every network segment. Devices (v) represents all the devices in node v E.
IMPORTANCE holds the business importance rank for each of the devices in the network. The use of the notation Importance(d) represents the rank for a particular device d, Output:
SCORES—the evaluated non-negative risk scores for all the exploits in EXPLOITS. The use of the notation RiskScore(e) represents the score, which was computed for a particular exploit e.

According to some embodiments, nodes in the graph represent segments in the network. Each segment contains various devices. Edges in the attack graph, for example, v, u, means that there is/are vulnerability/s in devices contained in segment u, wherein said vulnerability/s may be exploited from devices contained in segment v.

According to some embodiments, the exploits are calculated from device to device and aggregated by the segments. According to some embodiments, the vulnerability score of a particular exploit is based on CV SS score, and not influenced by any source or target device.

According to some embodiments, in operation 104 a report describing how vulnerabilities can be exploited is produced. According to some embodiments, each record in the report may contain the following fields:

(i) Destination IP address—describes the potential target of an attack.

(ii) Vulnerability ID—describes the vulnerabilities that create security exposure.

(iii) Port & Protocol—describes the exact transport layer port on which the asset is exposed.

(iv) Source IP address—describes from which IP address the attack can be executed.

(v) Cross-segment flag—describes a logical flag (a.k.a. a boolean flag having only a true or false value), which signifies whether or not the source and destination devices of a corresponding attack are located in different segments of the network.

(vi) Computed risk score.

According to some embodiments, a user can manually resolve detected security gaps, by patching or applying configuration changes to remove the existing vulnerabilities. For the report records produced in operation 104, where the cross-segment flag is true, the attack can also be prevented by the insertion of the appropriate traffic filtering rules (that block or permit traffic to/from specific 1P addresses through a specific port and protocols) in the gateways which are positioned between the two segments.

In another embodiment, the user may optionally choose to apply the protective measures by machine as part of operation 106. The result of whichever approach the user chooses (patching, reconfiguration or applying additional segmentation rules) will be the same from the perspective of the presented methodology. In some embodiments, when applied by machine, such protective measure may be applied in real time during operation and without disruption of operation.

Figure 2A:
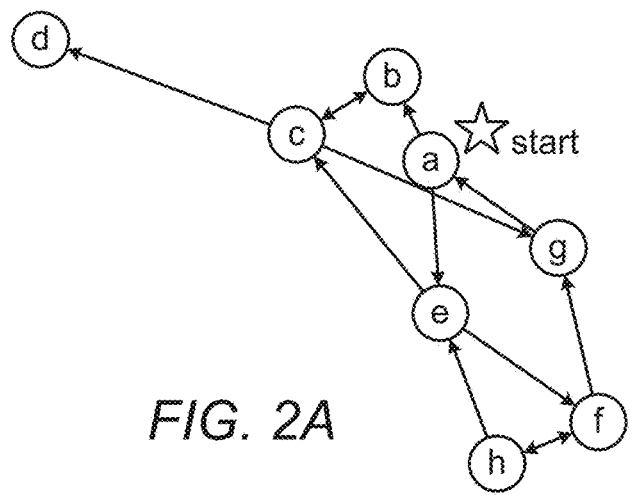
FIGS. 2A, 2B and 2C constitute schematic diagrams illustrating possible representations of an attack graph, according to some embodiments of the invention.
Figure 2B:
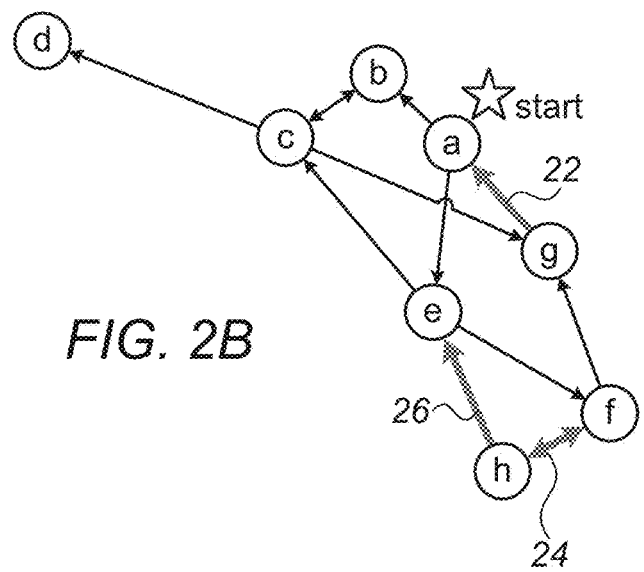
Figure 2C:
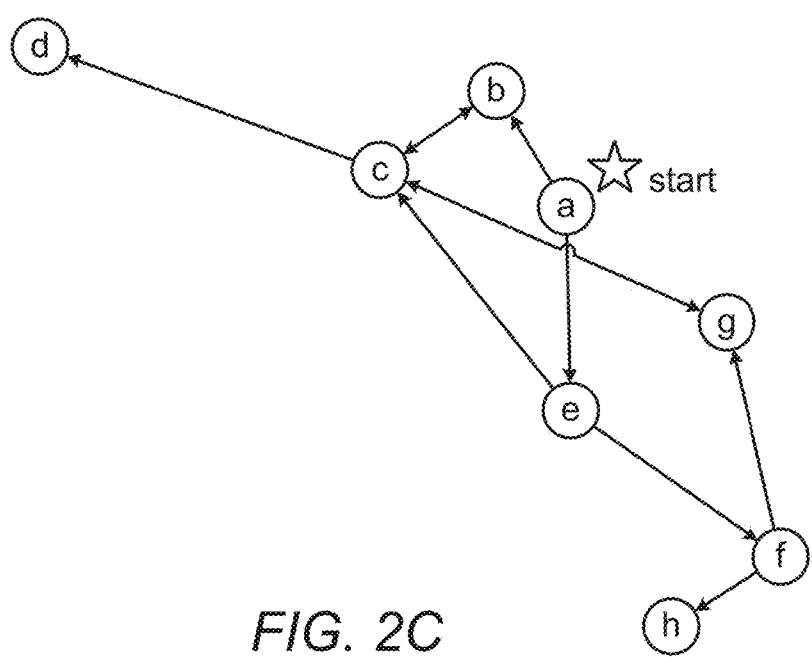

Reference is now made to FIGS. 2A, 2B and 2C which schematically illustrate possible representations of an attack graph. As shown, FIG. 2A illustrates an original representation of an attack graph wherein an attacker starting point is node a (or subnet a) and edges (g, a), (h, e), (h, f) are defined lay the FindCyclicEdges method as cyclic edges.

According to previously disclosed FindCyclicEdges, FIG. 2B illustrates a scenario wherein nodes a and g will be removed since the attacker doesn't have to visit node g in order to arrive to node a, in other words, (g, a) is a cyclic edge because g points to the attacker start point (a) via path 22. According to previously disclosed step 3.2, and as part of the FindCyclicEdges algorithm, node h and f will be removed since the attacker will not attack node f via node h since the only way to get from node a to node h is via node f, in other words, (h, f) is a cyclic edge because all the paths (for example, path 24) from a to h pass through f. Node h and e will also be removed since the attacker will not attack node e via node h since the only way to get from node a to node h is via node e, in other words, (h, e) is a cyclic edge because all the paths (for example, path 26) from a to h pass through e. According to some embodiments, FIG. 2C represents a modified representation of said attack graph after the removal of cyclic edges disclosed above.

Figure 3:
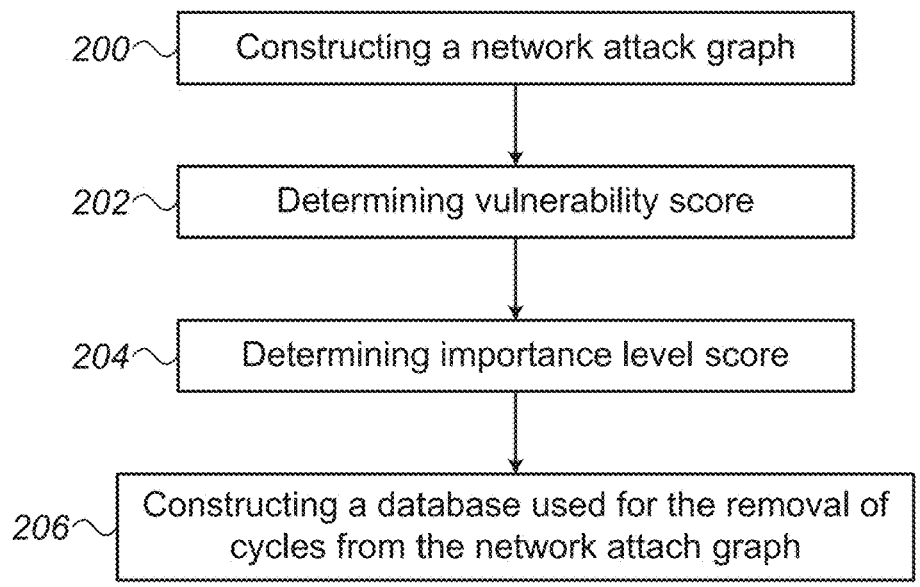
FIG. 3 constitutes a flowchart diagram illustrating a method for refining a network attack graph, according to some embodiments of the invention.

Reference is now made to FIG. 3 which constitutes a flow chart diagram comprising the steps for refinement a network attack graph. As shown, in operation 200 a network attack graph that describes potential exploitations of network vulnerabilities is constructed. The network attack graph represents all the possible ways in which an attacker spreads across different segments by the exploitation of vulnerabilities which exist on a network and may comprise multiple attack paths. The constructed network attack graph may serve in identifying possible/potential attack routes which may be used by an attacker to arrive at each of the assets in a network as the process progresses, and thereby constitutes probable points of vulnerability. According to some embodiments, the probability of an adverse effect (the probability that an asset will be affected) is also calculated. In operation 202, a vulnerability score is determined for each one of said detected vulnerabilities by conducting comprehensive vulnerability analysis. In operation 204, an importance score related to the importance level of every device on the network is determined. According to some embodiments, the security risk score will be higher in cases where the target of the potential exploit is of higher importance score. According to some embodiments, exploits into devices and network segments with a low number of incoming exploits and a high number of outgoing exploits will have higher importance score and vice versa. In operation 206, a database is constructed to be used for the removal of cycles from the network attack graph. According to some embodiments, a cycle in an attack graph represents a scenario where an attacker returns to a node which the attacker has already visited (exploited) in a previous state. A cycle can mislead the computation of security metrics, the reason for it is the fact that a risk score of exploits (for example, exploit e for v to u previously disclosed) is combined from several factors (except from the vulnerability score) that are influenced from the number of in-edges to u. Since no reasonable attack exist from v to u, therefore, it will be redundant to consider the edge (v, u) for calculating a risk score using ComputeRiskScores method. Therefore, it may be beneficial to remove such cycles from the attack graph.

Figure 4:
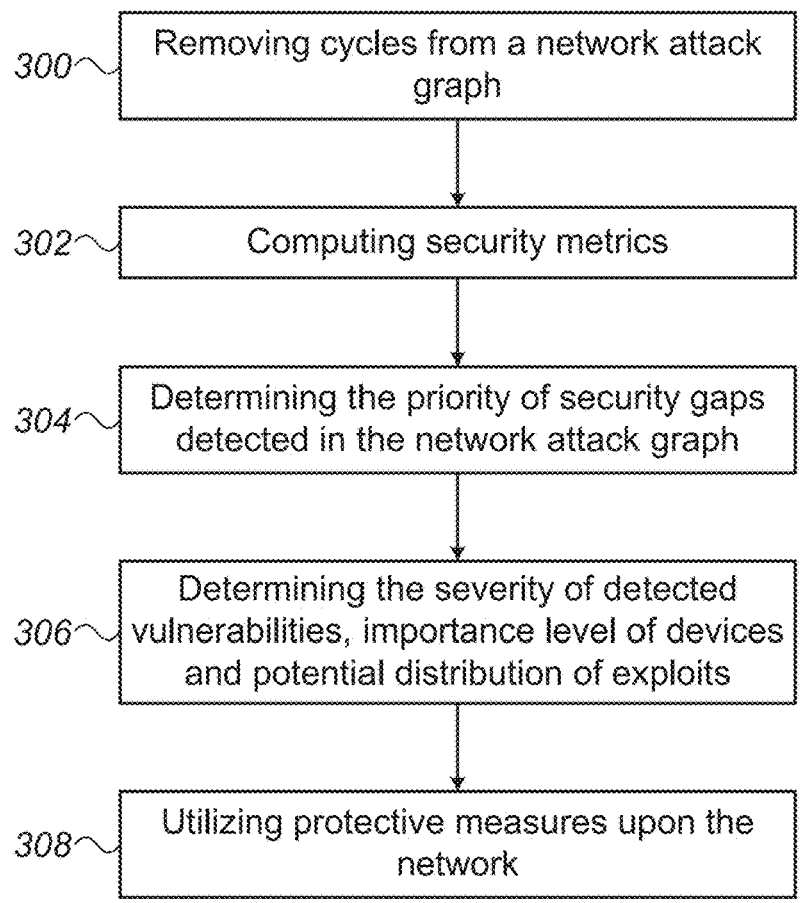
FIG. 4 constitutes a flowchart diagram illustrating a method for utilizing risk scoring evaluation, according to some embodiments of the invention.

Reference is now made to FIG. 4 which constitutes a flow chart diagram comprising steps for utilizing risk scoring evaluation, according to some embodiments of the invention. As shown, in operation 300, cycles are removed from a network attack graph. As previously disclosed, cycles are removed since they do not add any valuable information to the risk analysis and moreover, a cycle may bias the computation of security metrics. Cycles may be removed using FindCyclicEdges algorithm as disclosed above. In operation 302 security metrics are computed in accordance with the produced network attack graph. According to some embodiments, security metrics may be obtained as part of any type of known vulnerability analysis methods. In operation 304 a risk score evaluation is used to determine the priority of security gaps detected in the network attack graph. In operation 306 the severity of detected vulnerabilities in the network, the importance level of every device on the network and the potential distribution of detected exploits are determined in accordance with the risk score evaluation. In operation 308 the user may choose to apply protective measures either by machine or manual means.

According to some embodiments, said protective measures may include applying patching, reconfiguration or additional segmentation rules upon the network wherein said protective measures may be performed either by machine or manually in order to mitigate relevant network vulnerabilities. According to some embodiments, in case the cross-segment flag is raised, an attack can be prevented by the insertion of the appropriate traffic filtering rules in the gateways which are positioned between two segments.

According to some embodiments, among the protective measures that may be activated are blocking of malicious application signatures. Signature-based threats detection is often used to identify known IT threats. In IT, most objects have attributes that can be used to create a unique signature. Methodical machined processes can quickly and efficiently scan an object to determine its digital signature. When an object is identified as malicious, its signature is added to a database of known malware. According to some embodiments, these repositories may contain hundreds of millions of signatures that identify malicious objects that may be blocked. According to some embodiments, this method of identifying malicious objects may be used by firewalls, email services, network gateways, etc.

According to some embodiments, said protective measures may include blocking rules for unwanted communication in the network. Blocking rules allow or deny traffic to and from a network based on a configuration that is specified by, the user. An administrator may allow a general use of a certain network, but is interested in blocking certain applications, when use of said denied applications is detected, thus a user may be directed to another network location specified in advance. According to some embodiments, blocking rules may be utilized using a firewall network security systems or any other known IT security system.

According to some embodiments, said blocking rules may be traffic filtering rules that block or permit traffic to/from specific IP addresses through a specific network port/protocol.

According to some embodiments, said protective measures may include changing weak login credentials to an asset within a network. Weak logging-in (or signing-in) credentials may enable an intruder to gain access to an asset within the network by, for example, using statistical means and protocols to crack an obvious or a simple password. Changing weak credentials following a risk scoring evaluation may deny such an intrusion. According to some embodiments, weak credentials may be changed to credentials specified by the user or to random credentials selected by the machine instigated protective measures.

According to some embodiments, risk scoring evaluation may be conducted using "ComputeRiskScores" (V', E', EXPLOITS, DEVICES, IMPORTANCE) method as previously disclosed.

Figure 5:
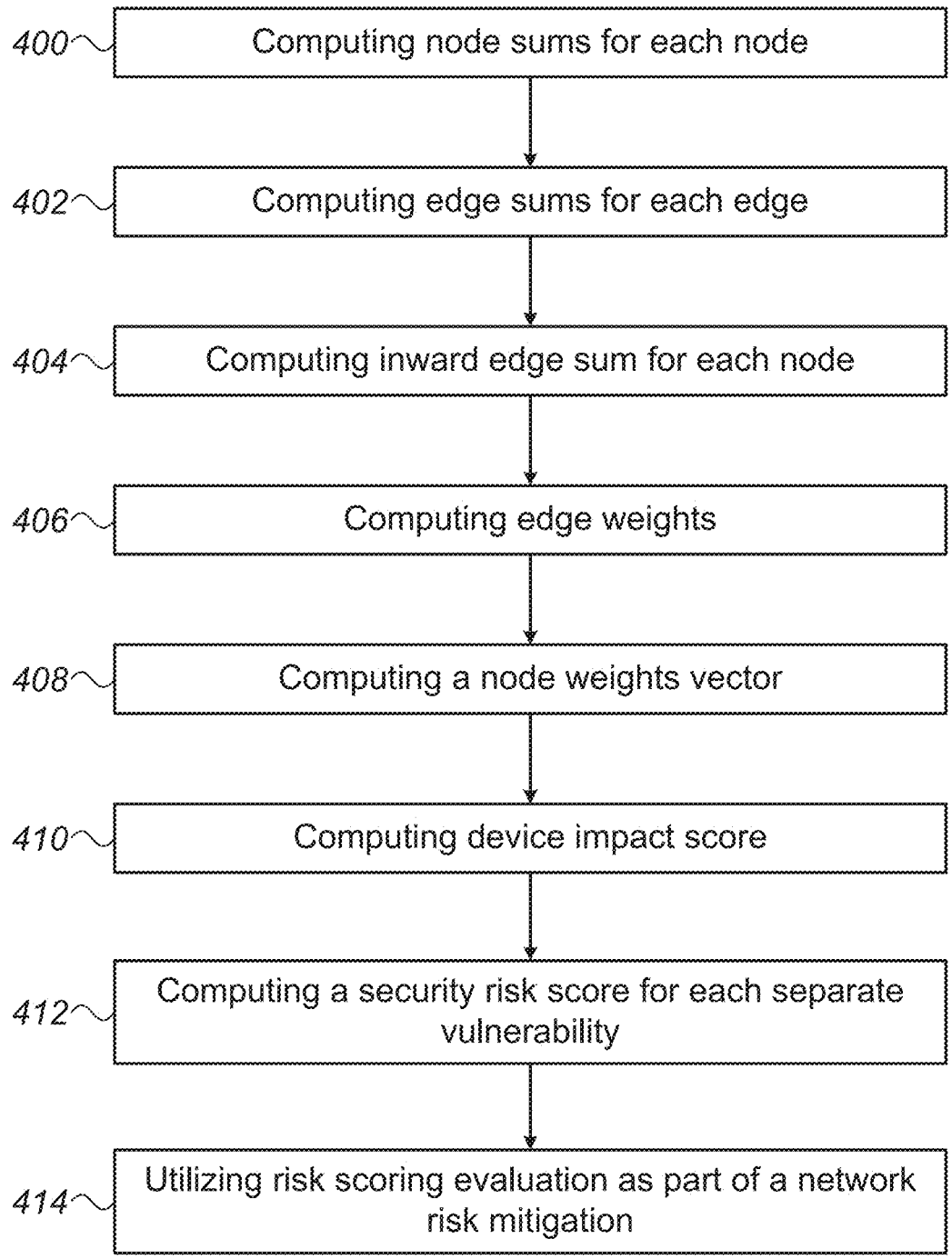
FIG. 5 constitutes a flowchart diagram illustrating a method for utilizing risk scoring evaluation, according to some embodiments of the invention.

Reference is now made to FIG. 5 which constitutes a flow chart diagram comprising the steps for utilizing risk scoring evaluation, according to some embodiments of the invention. As shown, in operation 400, node sums may be computed for each node (considered herein as network segment), by summing the importance scores of all the vulnerable devices which belong to the respective node. According to some embodiments, this may be performed using the following expression:

$$NodeSum(v) = \sum_{d \in Devices(v)} Importance(d)$$

In operation 402, edge sums may be obtained for each edge by summing the vulnerability scores of all the vulnerabilities of a respective edge. According to some embodiments, this may be performed using the following expression:

$$EdgeSum(u, v) = \sum_{e \in Exploits(u,v)} VulnerabilityScore(e)$$

In operation 404, inward edge sum may be obtained for each node by summing the edge sums of all edges that are directed to the respective node. According to some embodiments, this may be performed using the following expression:

$$InwardSum(v) = \sum_{w \in \{w' | (w',v) \in E'\}} EdgeSum(w, v)$$

In operation 406, edge weights (EdgeWeight in the expression) may be obtained by normalizing the edge sum with the inward edge sum of the target node. According to some embodiments, this may be performed using the following expression:

$$EdgeWeight(u, v) = \frac{EdgeSum(u, v)}{InwardSum(v)}$$

In operation 408, node weights vector (NodeWeight in the expression) may be obtained using an asset ranking method (by way of assets' importance to operability), where a weighted adjacency matrix is set according to the values of edge weights as per operation 406, and the intrinsic value vector is set according to the values of node sum (NodeSum in the formula) as per operation 400.

In operation 410, the device impact scores may be obtained. According to some embodiments, this may be performed using the following expression:

$$DeviceImpact(d) = f_{logistic}\left(\sum_{e \in \{e' | SourceDevice(e')=d\}} \frac{VulnerabilityScore(e) \cdot NodeWeight(TargetNode(e))}{InwardSum(TargetNode(e))}\right)$$

According to some embodiments, flogistic is a logistic function configured to calibrate all of the device impact values to a predefined range:

$$f_{logistic}(z) = \frac{\alpha}{1 + e^{-\beta(z-z_0)}}$$

According to some embodiments, $\alpha$, $\beta$ and $z_0$ are parameters that can be tuned to achieve the desired shape for the outputs.

In operation 412, a security risk score may be obtained for each separate vulnerability. According to some embodiments, this may be performed using the following expression:

$$RiskScore(e) = \frac{VulnerabilityScore(e) \cdot NodeWeight(TargetNode(e)) \cdot DeviceImpact(TargetDevice(e))}{InwardSum(TargetNode(e))}$$

In operation 414, risk scores, obtainable by the above-described operations, may be utilized to prioritize actions that should be taken in order to prevent an attacker from taking advantage of the different vulnerabilities present in and to the network.

COMPLEXITY ANALYSIS EXAMPLES

According to some embodiments, there is provided examples for algorithms analysis. Algorithm analysis or complexity analysis is the process of finding the computational complexity of algorithms. In other words, said process analyzes the amount of time, storage, or other resources needed to execute a certain algorithm. Said process may further comprise determining a function that relates to the length of an algorithm's input, to the number of steps it utilizes (its time complexity), or the number of storage locations it uses (its space complexity).

Example 1

Given that V is the set of nodes in the attack graph and N represents the number of nodes in the attack graph, according to some embodiments equation N=|V| represents the number of network segments in an attack graph. Given that E is the set of edges in the attack graph and M represents the number of edges in the attack graph, according to some embodiments equation M=|E| represents the number of edges in an attack graph. The "FindCyclicEdges" method is executed in accordance with previously disclosed steps, where the depth-first search (DFS) traversal (previously disclosed in step 3.2.1), is performed at most M times for every edge in the attack graph, therefore, the upper bound on the complexity is $O(M^2+M*N)$ (given that O represents the limiting behavior of a function by describing the computation complexity of the aforementioned method). According to some embodiments, the actual complexity will be much lower, since the worst-case complexity of O(M+N) (wherein O(M+N) means that the algorithm is linearly bounded by the number of nodes and edges in the graph) for the DES traversal will only be reached for cyclic edges. In all other cases, the search for an alternative path is expected to finish much faster.

Example 2

Further to using Example 1 above, and given that D is the maximal number of devices in a single network segment and K is the maximal number of vulnerabilities which can be possibly detected on a single device, the maximal number of exploits on each edge is $D^2*K$. The upper hound on the computational complexity of the "ComputeRiskScores" method is $O(M*D^2*K+N^2+N*D^3*K)$ and it is dominated by the complexity $O(M*D^2*K)$ (as in operation 402 previously disclosed), $O(N^2)$ (as in operation 408 previously disclosed), or $O(N*D^3*K)$ (as in operation 410 previously disclosed). According to some embodiments, such polynomial complexity is fairly reasonable and should enable short execution times on modern machines, even for large networks with tens of thousands of devices, as long as proper segmentation is applied to keep D at a moderate range.

Although the present invention has been described with reference to specific embodiments, this description is not meant to be construed in a limited sense. Various modifications of the disclosed embodiments, as well as alternative embodiments of the invention become apparent to persons skilled in the art upon reference to the description of the invention. It is, therefore, contemplated that the appended claims will cover such modifications that fall within the scope of the invention.

The invention claimed is:

1. A method for utilizing a risk score evaluation, comprising the steps of:
   (i) computing node sums for each node by summing the importance scores of vulnerable devices which belong to a respective node,
   (ii) computing edge sums for each edge by summing the vulnerability scores of the vulnerabilities on a respective edge,
   (iii) computing inward edge sum for each node by summing the edge sums of edges directed to a respective node,
   (iv) computing edge weights by normalizing the edge sum with an inward edge sum of a target node,
   (v) computing a node weights vector, wherein a weighted adjacency matrix is set in accordance with the values obtained in step (iv), and
   wherein an intrinsic value vector is set in accordance with the values obtained in step (i),
   (vi) computing device impact scores,
   (vii) computing the security risk scores for each separate vulnerability, wherein the calculated risk score evaluation is utilized as part of a network risk mitigation and followed by protective measures to be conducted upon the network,
   wherein an automated network segmentation is facilitated to mitigate relevant network vulnerabilities; wherein short execution times are enabled during the conduction of the network segmentation by detecting and removing cyclic edges from network attack graph thereby restricting the number of devices in the network and
   (viii) computing security metrics over the resulting network attack graph and evaluating and prioritizing the security gaps detected in the network for mitigation.

2. The method of claim 1, wherein a detailed report is created based on said risk score evaluation.

3. The method of claim 1, wherein a user resolves the detected security gaps by manually applying configuration changes to mitigate relevant network vulnerabilities.

4. The method of claim 1, wherein the protective measures comprise blocking of malicious application signatures.

5. The method of claim 1, wherein the protective measures comprise applying blocking rules for unwanted communication in the network.

6. The method of claim 1, wherein the protective measures comprise modifying login credentials to an asset within the network.

* * * * *